United States Patent
Rösel et al.

(10) Patent No.: US 7,114,329 B2
(45) Date of Patent: Oct. 3, 2006

(54) METHOD FOR CHECKING AN EXHAUST GAS CLEANING PLANT

(75) Inventors: Gerd Rösel, Regensburg (DE); Hong Zhang, Tegernheim (DE)

(73) Assignee: Siemens Aktiengesellschaft, München (DE)

(*) Notice: Subject to any disclaimer, the term of this patent is extended or adjusted under 35 U.S.C. 154(b) by 91 days.

(21) Appl. No.: 10/890,391

(22) Filed: Jul. 14, 2004

(65) Prior Publication Data
US 2005/0022508 A1 Feb. 3, 2005

(30) Foreign Application Priority Data
Jul. 15, 2003 (DE) ............... 103 32 057

(51) Int. Cl.
*F01N 3/00* (2006.01)
(52) U.S. Cl. .............. 60/285; 60/274; 60/277; 60/276
(58) Field of Classification Search .......... 60/274, 60/276, 277, 285, 297
See application file for complete search history.

(56) References Cited

U.S. PATENT DOCUMENTS

| | | | |
|---|---|---|---|
| 6,119,448 A * | 9/2000 | Emmerling et al. | 60/274 |
| 6,301,878 B1 * | 10/2001 | Zhang et al. | 60/274 |
| 6,455,009 B1 * | 9/2002 | Kato et al. | 422/110 |
| 6,546,720 B1 * | 4/2003 | van Nieuwstadt | 60/286 |
| 6,694,724 B1 * | 2/2004 | Tanaka et al. | 60/274 |
| 6,698,188 B1 * | 3/2004 | Irisawa et al. | 60/285 |
| 6,705,078 B1 * | 3/2004 | Hahn et al. | 60/285 |

FOREIGN PATENT DOCUMENTS

DE 199 53 601 A1 5/2001

* cited by examiner

*Primary Examiner*—Binh Q. Tran
(74) *Attorney, Agent, or Firm*—Morrison & Foerster LLP

(57) ABSTRACT

A method for checking an exhaust gas cleaning plant connected to an internal combustion engine in an exhaust gas tract that includes a catalytic converter having oxygen storage characteristics as well as a NOx sensor positioned downstream in the exhaust gas tract that emits a sensor signal depending on the NOx and the NH3 concentration in the exhaust gas in which case the internal-combustion engine is operated with a periodic air/fuel ratio oscillating around the value lambda=1 and that the average of the sensor signal is formed over one period or several periods and if the threshold value of the average is exceeded, damage to the monolith of the catalytic converter is detected.

5 Claims, 2 Drawing Sheets

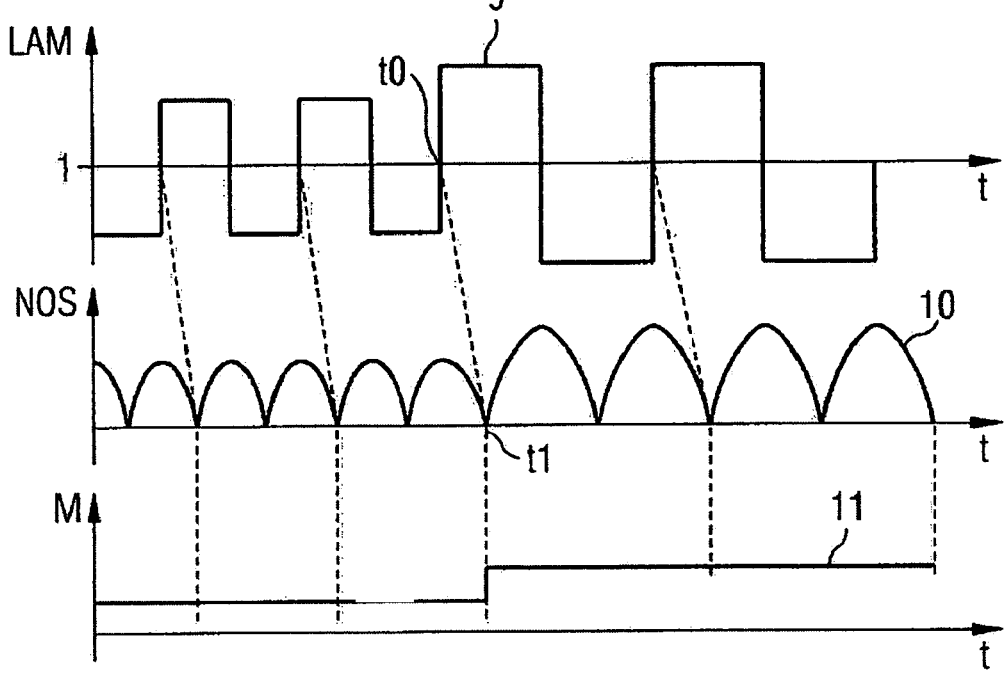
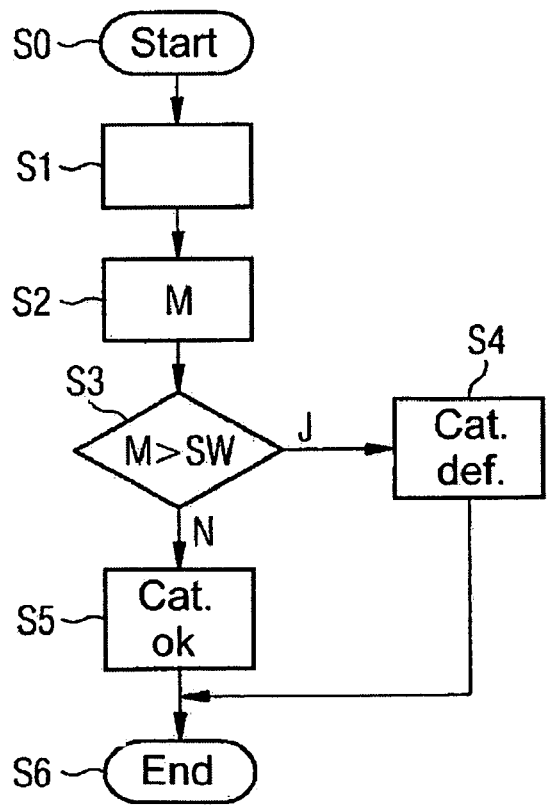

METHOD FOR CHECKING AN EXHAUST GAS CLEANING PLANT

CLAIM FOR PRIORITY

This invention claims the benefit of priority to German Application No. 10332057.1, filed in the German language on Jul. 15, 2003, the contents of which are hereby incorporated by reference.

TECHNICAL FIELD OF THE INVENTION

The invention relates to a method for checking an exhaust gas cleaning plant, and in particular, to a plant connected to an internal combustion engine in an exhaust gas tract.

BACKGROUND OF THE INVENTION

A conventional method for checking an exhaust gas cleaning plant is, for example, described in DE 199 05 192 A1 and is an example of an exhaust gas catalytic converter monitoring method that uses the catalytic converter that can store oxygen for the checking process. In this way, the fact that this catalytic converter that can store oxygen, correlates with the hydrocarbon conversion characteristic of the catalytic converter is utilized. If a catalytic converter has good hydrocarbon conversion capabilities, the lambda fluctuations of the air/fuel ratio by means of which the internal-combustion engine is operated, smooth out oxygen fluctuations called up by the lambda fluctuations of the catalytic converter. On the other hand, if a catalytic converter has no or only reduced conversion characteristics because of aging, contamination, leaded fuel or combustion malfunctions, a control oscillation upstream of the catalytic converter penetrates the catalytic converter downstream.

Therefore, on the one hand, with the generic method the air/fuel ratio is set by means of a corresponding intervention in the case of a lambda control device of the internal-combustion engine with an oscillation around lambda=1 that brings about an oxygen fluctuation in the exhaust gas that exceeds the normal operating ratios. At the same time, the NOx concentration is detected downstream of the catalytic converter to be checked and a suitable diagnostic value that is a measure for the aging condition of the catalytic converter is calculated. As an alternative to this method according to DE 199 05 192 A1, the signal of a linear lambda probe can also be evaluated downstream of the catalytic converter in order to measure the oscillation of the air/fuel ratio and with that the catalytic converter that can store oxygen and the aging condition of the catalytic converter.

However, with increasing importance of exhaust gas after-treatment in internal-combustion engines, it is not only necessary to be able to measure the aging condition of the catalytic converter, but also to detect cases in which the monolith of the catalytic converter is destroyed mechanically (so-called "empty catalytic converters"). It has been proven that such empty catalytic converters were not detected from time to time by means of conventional methods.

SUMMARY OF THE INVENTION

The invention relates to a method for checking an exhaust gas cleaning plant connected to an internal combustion engine in an exhaust gas tract that includes a catalytic converter having oxygen storage characteristics as well as a NOx sensor positioned downstream in the exhaust gas tract that emits a sensor signal depending on the NOx and the NH3 concentration in the exhaust gas in which case the internal-combustion engine is operated with a periodic air/fuel ratio oscillating around the value lambda=1.

Therefore, the invention further develops a method of the above-mentioned type such that cases with mechanically-destroyed catalytic converter monoliths are detected.

In one embodiment of the invention, there is a method of the above-mentioned type in which the average of the sensor signal is formed over one period or several periods and if the threshold value of the average is exceeded, damage to the monolith of the catalytic converter is detected.

The invention assumes that in the case of a defective monolith in the catalytic converter housing, the flow ratios in the catalytic converter change such that under circumstances, the measurement of the oxygen concentration downstream of the catalytic converter in this way, results in low values determined by the mixing processes in the catalytic converter housing. A catalytic converter diagnosis based on the measuring signal will then not detect a fault, although the emission threshold values have already been exceeded. The higher volume of the catalytic converter without a monolith allows intermixing of the exhaust gas with the result that downstream of the catalytic converter there is a reduced oscillation of the oxygen concentration because exhaust gas packages with an excess of oxygen mix with packages that have an oxygen deficiency. However, not only mixing processes reduce the oxygen oscillation, but the flow ratios of probes or sensors arranged downstream of the catalytic converter are also changed from time to time in such a way that specific exhaust gas components reach the measured point.

In this complex situation, the method according to the invention now provides a simple approach while by means of a NOx sensor that shows both a NOx and an NH3 concentration-dependency, the exhaust gas is sensed downstream of the catalytic converter and the average of the received sensor signal is formed over at least one period of the air/fuel ratio oscillation. In this, the fact that when an internal-combustion engine is operated with a rich fuel mixture, NH3 develops and when the mixture is lean, NOx develops, which is used in an advantageous way. Strictly speaking, the interfering cross-sensitivity of the NOx sensor then leads to the fact that the sensor signal follows the oscillation of the air/fuel ratio—in half periods in which the internal-combustion engine runs with a lean mixture because of the sensitivity to NOx and in half periods with a rich mixture because of the sensitivity to NH3. Therefore, the NOx sensor used detects the fluctuating NOx as well as the fluctuating NH3 concentrations in the exhaust gas.

Contrary to detecting the oxygen ratios where intermixing oxygen-rich with oxygen-lean exhaust gas components eliminates the oscillation, intermixing exhaust gas packages from rich mixtures with exhaust gas packages from lean mixtures neither changes the NOx nor the NH3 contents. Therefore, using the NOx sensor actually makes it much easier to detect an empty catalytic converter by simply monitoring the threshold values. A homogenizing of the oxygen contents downstream of the catalytic converter caused by an empty catalytic converter no longer plays a part.

For the method according to the invention, the sensor signal period-associated is evaluated, i.e. both a half period in which the internal-combustion engine was supplied with a rich mixture and a half period in which the internal-combustion engine was supplied with a lean mixture. Of course, synchronization should be chosen in such a way that in each case two coherent half periods are detected. This synchronization can lead to the fact that, for example, a corresponding gas runtime of the exhaust gas up to the NOx sensor is observed. In one embodiment of the method, synchronizing can be abandoned if it has been ensured that exactly one period is used.

A particularly advantageous way of evaluating, is forming an average over a period. In order to increase the accuracy of the diagnosis, an average can also be formed over several periods. However, an integral multiple of a period should be used.

The NOx or NH3 concentration emitted by a mechanically intact catalytic converter for a specific oscillation of the air/fuel ratio depends on the operating parameters of the internal-combustion engine. The age of the catalytic converter has a similar influence. Therefore, for a very precise diagnosis it is preferred that the threshold value is selected depending on the operating parameters of the internal-combustion engine and/or the age of the catalytic converter.

The average can be formed via one period or several periods in many different ways. For example, a corresponding lowpass filtering can be undertaken. The marginal conditions that the average is formed over precisely one period or via multiple periods are very easy to adhere to if the sensor signal is added up over a period or a resulting multiple and is divided by the corresponding periods. Of course, instead of adding up, integration is also possible.

In principle, for diagnosing each air/fuel ratio oscillating around the value lambda=1 can be used periodically; the threshold value used for checking the average should only be adapted to this. In order to avoid an incorrect diagnosis, the internal-combustion engine is usually operated in the short-term for diagnostic purposes with an oscillating air/fuel ratio that brings about an oxygen fluctuation of the exhaust gas that exceeds normal operation. In such a diagnostic phase, well-known algorithms for analyzing the catalytic converter that can store oxygen can then also be used very advantageously to detect the aging condition. Therefore, the method according to the invention is a further monitoring criterion in addition to the already well-known criteria of the catalytic converter diagnosis.

Such a criterion that can be used in addition to the evaluation according to the invention is, for example, gradually integrating the sensor signal over a period that is allocated to a half period of the air/fuel ratio oscillation and diagnosing a defective catalytic converter in the case of an integral value exceeding a threshold value. The threshold value is selected such that it cannot be reached by a catalytic converter that has been rated as just working. Of course, the integral value can be modified suitably, for example, operation parameter-dependent. It can also be gained by exceeding more than one half period of the air/fuel ratio oscillation. Therefore, regarding the additional diagnosis, full reference is made to the DE 199 05 192 A1 whose disclosure content is explicitly included here in this respect.

BRIEF DESCRIPTION OF THE DRAWINGS

The invention is explained in greater detail with reference to the drawings, in which:

FIG. 2 shows timing of signals occurring when checking the exhaust gas cleaning plant of FIG. 1.

FIG. 3 shows a flow chart illustrating the method for checking the exhaust gas cleaning plant.

DETAILED DESCRIPTION OF THE INVENTION

Figure 1:
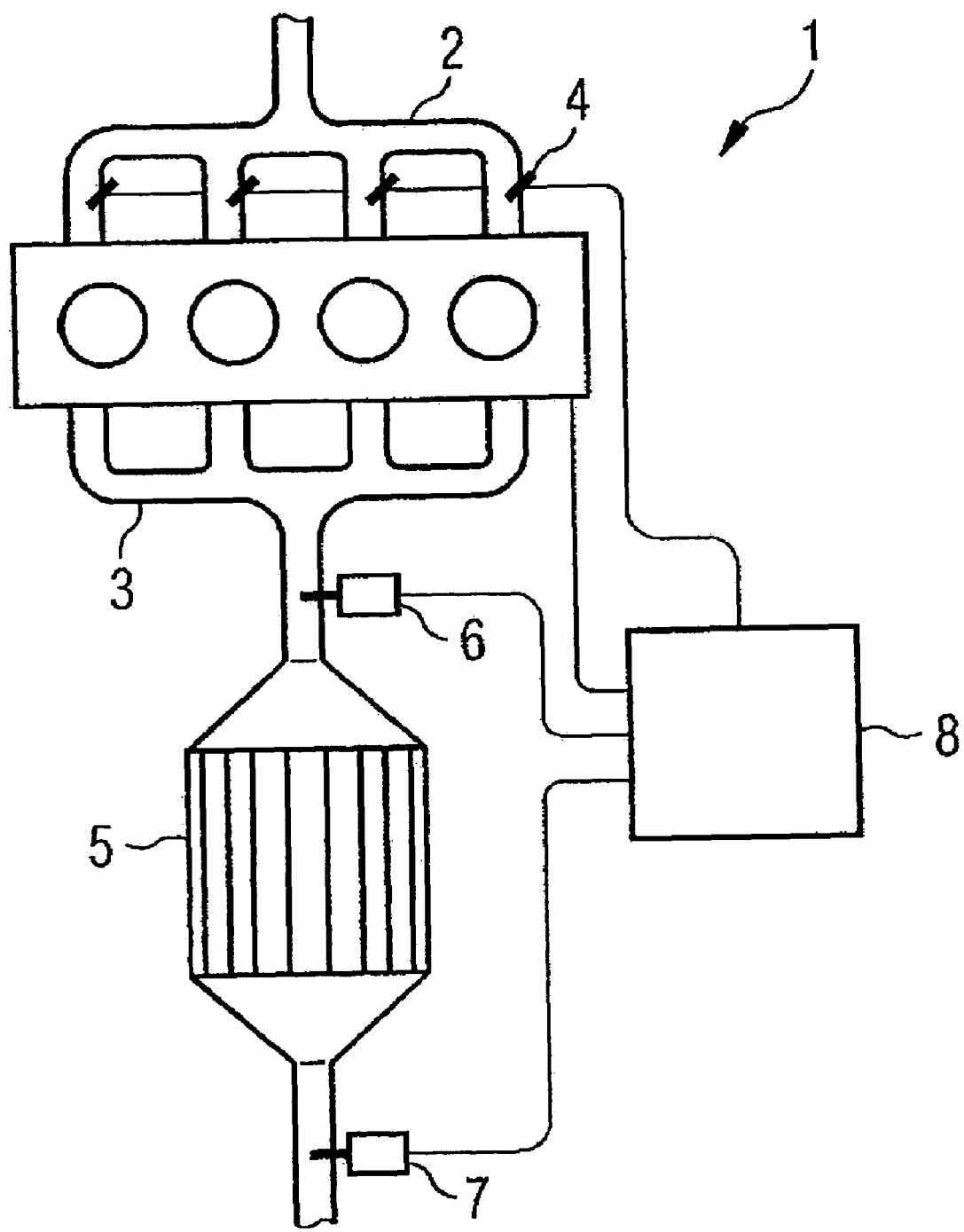
FIG. 1 shows an internal-combustion engine with an exhaust gas cleaning plant.

FIG. 1 is a diagrammatic representation of an internal-combustion engine 1 with an exhaust gas cleaning plant allocated to it and which is tested by means of a method. Therefore, only those components are shown that are needed for explaining the method and the representation of the fuel cycle is in particular abandoned.

The internal-combustion engine 1 has an intake plenum 2 for preparing the combustion air and an exhaust tract 3 in which the combustion exhaust gases are introduced. In the intake plenum 2, injection valves 4 are arranged via which the fuel mass required for the combustion is injected into the intake plenum 2. For this, the amount of air is measured (not shown).

In the exhaust gas tract 3 there is an exhaust gas catalytic converter 5. This can be any type of exhaust gas catalytic converter that can store oxygen and a three-way catalytic converter or a NOx storage catalytic converter can particularly be provided. However, in the latter case a catalytic converter which cannot store oxygen that is pre-connected to a NOx storage catalytic converter is also provided.

The exhaust gas cleaning plant with the catalytic converter 5 also has an oxygen pressure sensor arranged upstream of the catalytic converter 5 as a lambda probe 6 and a NOx sensor 7 lying downstream of the catalytic converter in the exhaust gas tract 3.

The NOx sensor 7 has an output signal NOS that correlates with the NOx concentration in the exhaust gas in which case the NOx sensor 7 also has a cross-sensitivity to NH3 that in a well-known way is positioned in the exhaust gas in the case of a sub-stoichiometric air/fuel ratio.

In order to control the internal-combustion engine 1 there is a control unit 8 that reads out the signals of the lambda probe 6 and the NOx sensor 7 via lines described in greater detail as well as detects diverse operating parameters of the internal-combustion engine 1. The control unit 8 also controls the injection valves 4 and then sets the air/fuel ratio of the mixture by means of which the internal-combustion engine 1 is operated.

Therefore, the control unit 8 in a forced excitation brings about a periodic oscillation of the air/fuel ratio that is symmetrical to the value for the stoichiometric mixture, i.e. symmetrical to lambda=1. This oscillation of the lambda value is shown in the lambda signal LAM of the lambda probe 6 that is shown in the lambda signal curve 9 of FIG. 2 as a time row, i.e. plotted over the time t. As curve 9 shows, the control unit 8 shows the air/fuel ratio in such a way that an oscillation takes place in the area of the maximum conversion capability of the catalytic converter 5 around the value lambda=1.

The NOx signal NOS of the NOx sensor 7 is entered as curve 10 and also leads to an oscillation as the course of the curve 10 allows to be detected. However, the oscillation of the NOx signal NOS distinguishes itself from the oscillation of the lambda signal LAM in two views. Whereas the lambda signal LAM has an oscillation that is to a large extent symmetrical to lambda=1, the NOx signal NOS has a curve that rather conforms to the rectifying lambda signal LAM, i.e. half waves of the oscillation of the lambda signal LAM in which the internal combustion engine 1 is supplied with a rich air/fuel mixture, in the case of the NOx signal NOS bring about an oscillation buckle running in the same direction in the same way as the half waves of the oscillation of the lambda signal LAM in which the internal-combustion engine was supplied with a lean mixture. On the other hand, the oscillation of the NOx signal NOS is phase-shifted compared to the lambda signal LAM. These two differences have the following causes:

Namely, the phase-shift is based on the fact that an exhaust gas package that is detected from the lambda probe 6 is only transported after a certain period from the exhaust gas flow to the NOx sensor 7. Namely, the phase-shift is determined by the gas runtime on the path between the lambda probe 6 to the NOx sensor 7.

The rectifying of the signal NOS is based on the fact that the NOx sensor 7 addresses both the NOx concentrations and the NH3 concentrations. If the internal combustion engine 1 is operated with a lean air/fuel ratio, i.e. with lambda values exceeding 1, NOx results as is generally known. Therefore, the NOx signal NOS has a corresponding oscillation buckle for half periods in which the lambda signal LAM exceeds 1. On the other hand, if the internal-combustion engine 1 runs with a sub-stoichiometric mixture there is a higher NH3 concentration in the exhaust gas to which the NOx sensor 7 also reacts sensitively for which reason the NOx signal NOS for the half periods also has an oscillation buckle directed upwards in which the lambda signal is also under 1. In FIG. 2, for reasons of simplicity, the half waves of the oscillation of the NOx signal NOS that occur when supplying the internal-combustion engine with a sub-stoichiometric mixture are shown as the same size as half waves in which case the internal-combustion engine runs with a sub-stoichiometric mixture. However, in reality this need not always be the case particularly because the sensitivity of the NOx sensor 7 on NOx or NH3 is mostly not the same in all the operating points or the NOx concentration is not always equivalent to the NH3 concentration.

In order to check the exhaust gas cleaning plant, the oscillation of the air/fuel ratio is changed in such a way from the point in time t0 that, on the one hand, the oscillation frequency is reduced and, on the other hand, the oscillation amplitude is increased. Both measures bring about that the oxygen ratio in the exhaust gas has a greater fluctuation than before the point in time t0. The lambda signal LAM clearly shows this change in the curve 9 from the point in time t0: the amplitude and period increase. Of course, one of these two measures can also be used individually.

The NOx signal NOS follows this behavior, i.e. both the amplitude and the period increase equally.

FIG. 3 shows the sequence of the method as a flow chart for checking the exhaust gas cleaning plant. After a start in step S0, the lambda oscillation changes in step S1 as is the case from the point in time t0 in FIG. 2. However, in principle, it could also be possible already to work with a lambda oscillation during normal operation.

Subsequently, in step S2, the average of the NOx signal NOS is determined over a period of the oscillation of the lambda signal LAM. This average is entered in FIG. 2 as curve 11. As can be seen, it increases at the point in time t1 when the oscillation of the air/fuel ratio changes. In this case, it is important that the average is determined over exactly a period or a multiple thereof so that in each case a half wave of the NOx signal NOS in which the internal-combustion engine was supplied with a rich mixture and exactly a half wave in the case of which the internal-combustion engine ran with a lean mixture, is used in determining the average.

It is subsequently checked in step S3 whether or not the average M exceeds a threshold value SW. The threshold value depends on the set lambda oscillation. If M>SW (J branching), the catalytic converter is diagnosed as defective in step S4. Otherwise (N branching), the catalytic converter is classified as in good order in step S5. Step S6 ends the method.

The average used gives information about the fact whether or not a certain emission of NOx and NH3 compounds were exceeded in the case of the oscillation of the air/fuel ratio as can only be the case in a mechanically-destroyed catalytic converter monolith. Therefore, if the method checking the exhaust gas cleaning plant in step S4 finds that the catalytic converter is defective, there is a so-called empty catalytic converter, i.e. the monolith of the catalytic converter 5 has been damaged mechanically.

Should the monolith be defective, not only will the oscillation with a higher amplitude be set at the NOx sensor 7, but the zero point will also be shifted (not shown in FIG. 2). Both effects increase the formed average so that the diagnosis is particularly sensitive.

What is claimed is:

1. A method for checking an exhaust gas cleaning plant connected to an internal combustion engine in an exhaust gas tract that includes a catalytic converter having oxygen storage characteristics and a NOx sensor positioned downstream in the exhaust gas tract, comprising:

emitting a sensor signal depending on a NOx and NH3 concentration in the exhaust gas in which case the internal-combustion engine is operated with a periodic air/fuel ratio oscillating around a value lambda =1; and, forming an average of the sensor signal over at least one period and if a threshold value of the average is exceeded, detecting damage to a monolith of the catalytic converter.

2. The method according to claim 1, wherein the threshold value is selected depending on operating parameters and at least one of the internal-combustion engine and an age of the catalytic converter.

3. The method according to claim 1, wherein the average is formed by adding up or integrating the sensor signal and dividing the period.

4. The method according claim 1, wherein the internal-combustion engine is operated in a short-term for diagnostic purposes with an oscillating air/fuel ratio that brings about an oxygen fluctuation of the exhaust gas that exceeds normal operation.

5. The method according to claim 4, wherein the sensor signal is gradually integrated over a period that is allocated to a half period of the air/fuel ratio oscillation and that a defective catalytic converter is diagnosed when an integral value exceeds the threshold value. and that a defective catalytic converter is diagnosed when an integral value exceeds the threshold value.

* * * * *